United States Patent
Siggel et al.

(10) Patent No.: US 10,730,150 B2
(45) Date of Patent: Aug. 4, 2020

(54) FLOWABLE BRAZING COMPOSITIONS AND METHODS OF BRAZING METAL ARTICLES TOGETHER USING THE SAME (71) Applicant: HONEYWELL INTERNATIONAL INC., Morris Plains, NJ (US)

(72) Inventors: Alfred Siggel, Seelze (DE); Douglas Kenneth Hawksworth, Oakville (CA)

(73) Assignee: HONEYWELL INTERNATIONAL INC., Morris Plains, NJ (US)

(*) Notice: Subject to any disclaimer, the term of this patent is extended or adjusted under 35 U.S.C. 154(b) by 174 days.

(21) Appl. No.: 16/053,635

(22) Filed: Aug. 2, 2018

(65) Prior Publication Data
US 2019/0039190 A1   Feb. 7, 2019

Related U.S. Application Data (60) Provisional application No. 62/542,158, filed on Aug. 7, 2017.

(51) Int. Cl.
B23K 31/02       (2006.01)
B23K 35/00       (2006.01)
(Continued)

(52) U.S. Cl.
CPC ........... B23K 35/362 (2013.01); B23K 1/00 (2013.01); B23K 35/025 (2013.01); B23K 35/286 (2013.01); C22C 21/02 (2013.01)

(58) Field of Classification Search
CPC ........... B23K 1/00–206; B23K 35/362; B23K 35/286; B23K 35/025; B23K 1/19;
(Continued)

(56) References Cited

U.S. PATENT DOCUMENTS 2,228,352 A * 1/1941 Hopfield .............. C03C 27/046
                                                    228/188
2,403,110 A * 7/1946 Miller ................. B23K 35/3603
                                                    148/23
(Continued)

FOREIGN PATENT DOCUMENTS

EP       0980738 A2    2/2000

OTHER PUBLICATIONS

International Search Report for Application No. PCT/US2018/045417 dated Dec. 19, 2018.
(Continued)

Primary Examiner — Kiley S Stoner
(74) Attorney, Agent, or Firm — Lorenz & Kopf, LLP (57) ABSTRACT Flowable brazing compositions and methods of brazing metal articles together using the same are provided herein. In an embodiment, a flowable brazing composition includes a non-polymeric carrier medium and flux-coated particles. The carrier medium includes at least one polar organic solvent and is liquid at ambient temperature. The flux-coated particles include a braze material core and a flux coating disposed on the core. The braze material core includes different material from the flux coating. The flowable brazing composition has less than or equal to about 1.5 weight % of polymeric binder components, based upon a total weight of the flowable brazing composition.

20 Claims, 2 Drawing Sheets (51) Int. Cl.
  *B23K 35/362* (2006.01)
  *C22C 21/02* (2006.01)
  *B23K 1/00* (2006.01)
  *B23K 35/28* (2006.01)
  *B23K 35/02* (2006.01)

(58) Field of Classification Search
  CPC .............. B23K 35/0244; B23K 3/0638; B23K 3/0623; C22C 21/02
  USPC ................... 228/248.1–248.5, 179.1–180.22; 148/23–24
  See application file for complete search history.

(56) References Cited

U.S. PATENT DOCUMENTS

| | | | |
|---|---|---|---|
| 2,893,903 A | 7/1959 | Wernz | |
| 3,031,346 A | 4/1962 | Wasserman | |
| 3,409,478 A * | 11/1968 | Condit | B23K 35/36 148/23 |
| 3,703,254 A * | 11/1972 | Maierson | B23K 35/0244 428/407 |
| 3,708,449 A * | 1/1973 | Ippolito | B23K 35/3613 524/270 |
| 3,736,653 A * | 6/1973 | Maierson | B23K 35/0244 228/224 |
| 3,971,501 A | 7/1976 | Cooke | |
| 4,298,407 A * | 11/1981 | Taylor | B23K 35/0244 148/24 |
| 4,475,960 A | 10/1984 | Yamawaki et al. | |
| 5,011,546 A * | 4/1991 | Frazier | B23K 35/36 148/23 |
| 5,100,048 A | 3/1992 | Timsit | |
| 5,173,126 A | 12/1992 | Ogura et al. | |
| 5,226,974 A | 7/1993 | Conn | |
| 5,272,007 A * | 12/1993 | Jenkinson | B23K 35/0244 428/403 |
| 5,431,745 A * | 7/1995 | Koschlig | B23K 35/02 148/24 |
| 5,450,666 A | 9/1995 | Conn et al. | |
| 5,616,164 A * | 4/1997 | Ochiai | B22F 1/0048 134/2 |
| 5,736,074 A * | 4/1998 | Hayes | B01J 2/006 264/6 |
| 5,749,938 A | 5/1998 | Coombs | |
| 5,755,374 A | 5/1998 | Prigmore | |
| 6,203,628 B1 * | 3/2001 | Katoh | B23K 35/025 148/23 |
| 6,506,448 B1 * | 1/2003 | Minogue | B22F 1/0059 257/E23.075 |
| 6,656,290 B1 * | 12/2003 | Koch | B23K 35/025 148/24 |
| 2001/0045244 A1 * | 11/2001 | Akaike | B23K 35/3613 148/25 |
| 2002/0005230 A1 | 1/2002 | Watsuji | |
| 2002/0102432 A1 * | 8/2002 | Ochiai | B23K 35/025 428/671 |
| 2003/0059642 A1 * | 3/2003 | Mei | B22F 1/025 428/570 |
| 2003/0203137 A1 * | 10/2003 | Teshima | B23K 35/3605 428/34.1 |
| 2005/0217757 A1 * | 10/2005 | Miyano | B23K 35/34 148/24 |
| 2007/0131141 A1 * | 6/2007 | Masatoki | H01L 23/49816 106/287.16 |
| 2007/0164089 A1 * | 7/2007 | Gaugler | B23K 3/0638 228/256 |
| 2009/0165893 A1 * | 7/2009 | Akazawa | B23K 35/0244 148/24 |
| 2010/0206529 A1 | 8/2010 | Ogilvy et al. | |
| 2011/0068149 A1 * | 3/2011 | Hirano | B22F 1/025 228/56.3 |
| 2013/0037172 A1 * | 2/2013 | Garcia-Juan | B23K 35/0238 148/23 |
| 2013/0323529 A1 * | 12/2013 | Kurita | B23K 1/0016 428/613 |
| 2018/0015572 A1 * | 1/2018 | Kawasaki | B23K 1/00 |
| 2018/0281118 A1 * | 10/2018 | Kawasaki | B23K 35/0238 |
| 2020/0047290 A1 * | 2/2020 | Katsumata | F28F 21/084 |

OTHER PUBLICATIONS

Written Opinion of the International Searching Authority for Application No. PCT/US2018/045417 dated Dec. 19, 2018.
Turbo Braze Corporation, "Powder Products," product brochure, www.turbobraze.com/powder.html, originally downloaded Feb. 2017.

* cited by examiner

FLOWABLE BRAZING COMPOSITIONS AND METHODS OF BRAZING METAL ARTICLES TOGETHER USING THE SAME

CROSS-REFERENCE TO RELATED APPLICATIONS

This application claims the benefit of U.S. Provisional Application No. 62/542,158, filed Aug. 7, 2017.

TECHNICAL FIELD

The technical field generally relates to flowable brazing compositions and methods of brazing metal articles together using the same, and more particularly relates to flowable brazing compositions and methods of brazing metal articles together using flowable brazing compositions that exhibit excellent storage stability.

BACKGROUND

Brazing is a metal-joining process in which two or more metal articles are joined together by melting and flowing a braze material, which may be a metal or a metal alloy, into a joint that is defined between the metal articles. More specifically, brazing is a thermally induced metallic bonding process that occurs below the melting point of the metals to be joined with the introduction between them in the joint of the braze material, which has a lower melting point than the metals to be joined. Upon subsequent cooling, the braze material forms a fillet that bonds the metal articles together at faying surfaces thereof. For assured selective melting of only the braze material during heating, the melting point of the braze material is typically chosen to be at least about 30° to 40° C. lower than that of the metal in the metal articles to be joined. For brazing aluminum articles together, for example, a suitable brazing alloy is an Al—Si eutectic composition, which melts at about 577° C.

The brazing process involves a number of metallurgical and chemical processes that take place both on the surface and within the materials. For example, good wetting and spreading of the molten braze material on the surface of the metal articles determine whether capillary action will occur. Capillary flow is the dominant physical principle that ensures an acceptable braze fillet in a properly spaced joint, provided molten braze material wets both surfaces that are to be joined. Capillary flow is affected by the presence of oxide films, surface roughness and the condition and properties of the brazing atmosphere.

Various techniques are employed to apply the braze material to the metal articles to be brazed. In one such technique, at least one of the surfaces being joined is pre-clad with a layer of aluminum brazing alloy. Such pre-clad articles, generally known as brazing sheet, are relatively costly, and in many instances it is preferred to provide the braze material in some form other than cladding. One known alternative is to apply the braze material to or adjacent to one or both joining surfaces in powdered or particulate form carried in a suitable liquid or paste-like vehicle. In such methods, a mixture of the braze material in powdered form, in an aqueous carrier or mixed with a binder, is coated on the surfaces to be joined. When included in an aqueous carrier, the coating is then dried and the surfaces are then heated to a brazing temperature whereby the brazing is completed. When included with a binder, e.g., a polymeric material that binds the braze material to the surfaces of the article to be brazed, the binder is generally burned off prior to brazing through pre-heating of the article after deposition of the coating thereon.

Brazing of some metal articles, such as aluminum and its alloys, is particularly difficult because an oxide film forms on the surface when exposed to air. The barrier action of the oxide film on aluminum hinders wetting and inhibits capillary flow. To enable intimate contact between the molten braze material and the base metal of the article, it is necessary to disrupt the oxide, for example through the use of an inorganic salt that acts as a flux. An inert brazing atmosphere free from oxygen and water vapor may be facilitated to prevent re-oxidation of the molten braze material and oxidation of the flux itself. This may be achieved by brazing under nitrogen or by using a vacuum. The flux must be capable of disrupting and/or otherwise remove the metal oxides at the brazing temperatures while remaining essentially inert with respect to the metal of the article, e.g., aluminum, at the brazing temperatures. Since fluxes are usually reactive only when at least partially molten, fluxes for aluminum brazing, for example, should as a practical matter be partly or wholly molten at brazing temperatures, e.g. at temperatures not substantially higher and preferably lower than 577° C. Flux materials heretofore commercially employed in brazing aluminum have commonly been mixtures of predominantly chloride salts, with minor additives of fluoride in some cases. An example of a suitable flux for brazing aluminum is a potassium fluoroaluminate sold under the trade mark NOCOLOK®. Although fluxless brazing procedures have been devised, their use is limited because of economic and other considerations arising from the special conditions and equipment required for successful practice of such procedures.

Flux-coated particles of braze material have been developed as an alternative to pre-cladding. The flux-coated particles provide excellent distribution of flux with the braze material, thereby maximizing effectiveness of the flux while also shielding the braze material from oxidation. The flux-coated particles are generally formed by spray forming using flux in particulate form. The flux particles contact atomized braze material droplets and melt to form a flux coating or partial flux coating on the braze material droplets, solidifying as coated powder and therefore providing a relative intimate mixture of braze material and flux.

The flux-coated particles are typically condensed and gathered on a cooled support pillar to form a pillar block of the flux-coated particles. The pillar block may be employed in later brazing applications in the as-formed form. By-product flux-coated particles that are not gathered by the cooled support pillar are often recycled. While alternative delivery vehicles for the flux-coated particles have been proposed, such alternative delivery vehicles present a host of difficulties. For example, it has been proposed to mix the flux-coated particles with liquid resin or binder or, alternatively, to dust the flux-coated particles onto the liquid resin after the liquid resin has been applied to a desired surface. The liquid resin is then cured to form a cured resin and to ensure adhesion of the flux-coated particles to the desired surface. However, use of the cured resin may present handling and application difficulties. For example, the cured resin must generally be removed, e.g., by pre-heating the braze-coated surface to decompose/pyrolyze the cured resin. Resin decomposition products can react with both the flux and substrate, thus inhibiting the brazing process. Further, adhesion of the flux-coated particles to the surface to be brazed restricts effective dispersal and surface coverage of the flux-coated particles on the surface to be brazed. It has also been suggested to include the flux-coated particles in an aqueous slurry. However, with use of both liquid resin and aqueous slurry as delivery vehicles for the flux-coated particles, particle segregation is a concern. Once segregated, the flux-coated particles are difficult to effectively re-disperse owing to generally high viscosity of the compositions. Of course, particle segregation severely impacts consistent quality of braze fillets formed using the flux-coated particles. Furthermore, the use of a liquid resin and flux coated particle slurry that is susceptible to segregation cannot be used to apply such particles in a large volume to a small surface area.

Accordingly, it is desirable to provide flowable brazing compositions and methods of brazing metal articles together using the flowable brazing compositions that employ flux-coated particles and that resist particle separation. In addition, it is desirable to provide flowable brazing compositions and methods of brazing metal articles together using the flowable brazing compositions that enable effective surface wetting and flow of flux-coated particles across a surface to be brazed. Furthermore, other desirable features and characteristics will become apparent from the subsequent detailed description and the appended claims, taken in conjunction with the accompanying drawings and this background.

BRIEF SUMMARY

Flowable brazing compositions and methods of brazing metal articles together using the same are provided herein. In an embodiment, a flowable brazing composition includes a non-polymeric carrier medium and flux-coated particles. The carrier medium includes at least one polar organic solvent and is liquid at ambient temperature. The flux-coated particles include a braze material core and a flux coating disposed on the core. The braze material core includes different material from the flux coating. The flowable brazing composition has less than or equal to about 1.5 weight % of polymeric binder components, based upon a total weight of the flowable brazing composition.

In another embodiment, a method of brazing metal articles together using a flowable brazing composition is provided. The method includes providing a brazing composition. The brazing composition includes a non-polymeric carrier medium and flux-coated particles. The carrier medium includes at least one polar organic solvent and is liquid at ambient temperature. The flux-coated particles include a braze material core and a flux coating disposed on the core. The flux coating includes a metal halide and the braze material core includes different material from the flux coating. The flowable brazing composition has less than or equal to about 1.5 weight % of polymeric binder components, based upon a total weight of the flowable brazing composition The brazing composition is deposited on at least one of the metal articles at a location where the metal articles are to be joined. The at least one metal article is heated to substantially remove the solvent from the flowable brazing composition. The metal articles are brazed together at a temperature and time sufficient to melt the core of the flux-coated particles.

In another embodiment, a flowable brazing composition is provided that consists of a non-polymeric carrier medium, flux-coated particles, flux particles, and, optionally, a non-polymeric thickener. The carrier medium consists of one or more polar organic solvents and is liquid at ambient temperature. The flux-coated particles include a braze material core and a flux coating disposed on the core. The flux coating includes a metal halide and the braze material core includes different material from the flux coating. The flux particles are separate from the flux-coated particles.

BRIEF DESCRIPTION OF THE DRAWINGS

The various embodiments will hereinafter be described in conjunction with the following drawing figures, wherein like numerals denote like elements, and wherein.

DETAILED DESCRIPTION

The following detailed description is merely exemplary in nature and is not intended to limit the flowable brazing compositions and methods of brazing metal articles together using the flowable brazing compositions. Furthermore, there is no intention to be bound by any theory presented in the preceding background or the following detailed description.

Flowable brazing compositions and methods of brazing metal articles together using the flowable brazing compositions are provided herein. As used herein, "flowable" means that the brazing composition has a viscosity at ambient temperatures such that the flowable brazing composition is present in a liquid/gel/paste state. The flowable brazing compositions employ flux-coated particles and have less than or equal to about 1.5 weight % of polymeric binder components, based upon the total weight of the flowable brazing composition, thereby alleviating the challenges associated with handling and application of brazing compositions that include higher amounts of polymeric binder components. Further, unlike aqueous slurries, the flowable brazing compositions also resist particle separation and, thus, provide more consistent braze fillet quality. Further still, the flowable brazing compositions include a non-polymeric carrier medium that includes at least one polar organic solvent and is liquid at ambient temperature. As such, being in the flowable state and resisting separation, the flowable brazing compositions enable effective surface wetting and flow of flux-coated particles across various surfaces to be brazed, such as aluminum-containing surfaces.

As alluded to above, the flowable brazing composition may be employed in brazing. Brazing is a metal-joining process in which two or more metal articles are joined together by melting and flowing a braze material, which may be a metal or a metal alloy, into a joint that is defined between the metal articles. More specifically and with reference to FIG. 1, brazing is conducted by heating the flowable brazing composition 10 and the metal articles 12 in appropriately assembled relation to a temperature (herein termed "brazing temperature") at which braze material in the brazing composition 10 melts while the metal articles 12 to be joined remain unmelted. Upon subsequent cooling and referring to FIG. 2, the braze material forms a braze fillet 14 that bonds the metal articles 12 together at faying surfaces thereof. For assured selective melting of only the braze material during heating, the melting point of the braze material is typically chosen to be at least about 30° to 40° C. lower than that of the metal in the metal articles 12 to be joined.

Referring again to FIG. 1, the flowable brazing composition 10 includes a non-polymeric carrier medium and flux-coated particles 16. Optionally, the flowable brazing composition 10 may further include additional components such as flux particles 18 that are separate from the flux-coated particles 16, and/or a non-polymeric thickener (not shown). By employing the non-polymeric carrier medium, sufficient stability can be achieved to minimize particle separation over time for the flux-coated particles 16. Although it is to be appreciated that other factors may contribute to particle separation such as, for example, the specific combination of solvents in the non-polymeric carrier medium, D50 particle size distribution and maximum particle size parameters, amount of particles in the flowable brazing composition 10, and presence/absence of thickeners, the sufficient storage stability cannot be achieved without the non-polymeric carrier medium as described herein.

Figure 1:
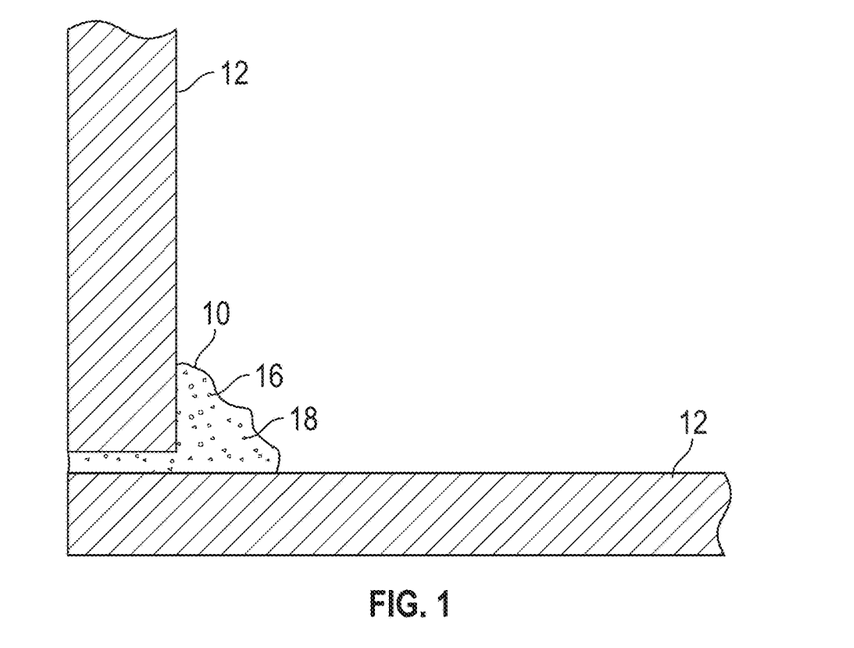
FIG. 1 is a schematic cross-sectional side view of a flowable brazing composition and a method of brazing using the flowable brazing composition with the composition disposed at a joint between adjacent metal articles to be joined through brazing in accordance with an embodiment.
Figure 2:
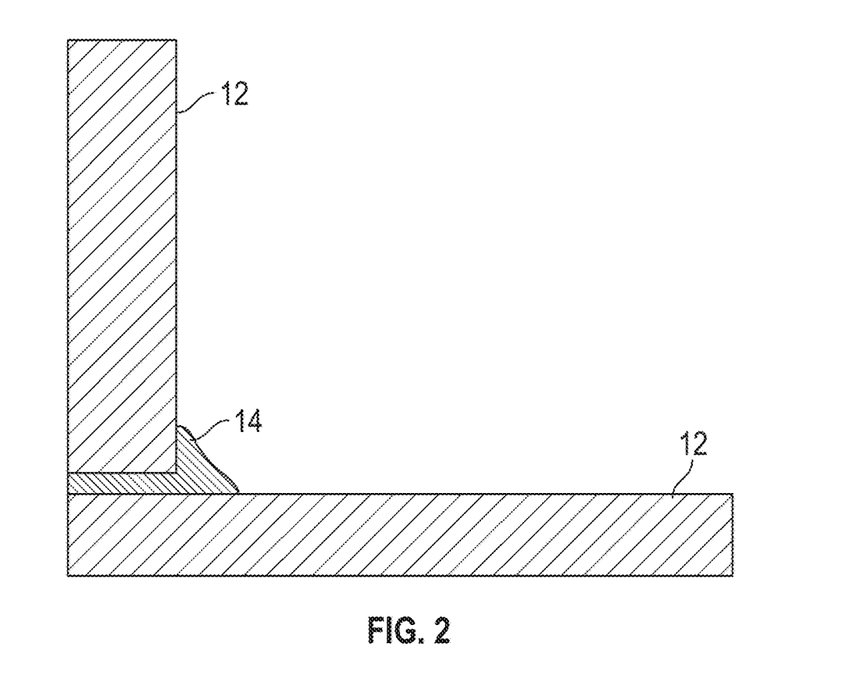
FIG. 2 is a schematic cross-sectional side view of the metal articles as shown in FIG. 1 after brazing.

The non-polymeric carrier medium includes at least one polar organic solvent and is liquid at ambient temperature. The non-polymeric carrier medium, as referred to herein, includes and is limited to any components in the flowable brazing composition 10 that can be considered polar organic solvents and that are liquid at ambient temperature. "Liquid," as referred to herein, means that the material is flowable or has a viscosity at ambient temperature. "Organic solvent," as referred to herein, means a carbon-containing solvent that optionally includes oxygen, nitrogen, or sulfur. Examples of organic solvents contemplated herein include, but are not limited to, hydrocarbons, alcohols, ethers, esters, ketones, and the like. In embodiments, the at least one polar organic solvent includes a C2-C10 aliphatic glycol, with a molecular weight of less than about 250 and includes branched and cycloaliphatic diols. Examples of suitable glycols include, but are not limited to. ethylen-, propylen-, hexylene-, tetramethylen-, pentamethylen-, 2,2-dimethyltrimethylen-, hexamethylen-, ethylhexylen- and decamethylenglycol; or cyclic diols such as, for example, dihydroxycyclohexan, cyclohexandimethanol; and mixtures thereof. For example, in an embodiment, the at least one polar organic solvent includes hexylene glycol and may further include a C2-C4 glycol. In addition to or as an alternative to glycols, in embodiments, the at least one polar organic solvent includes C2 to C4 alcohol, such as isopropyl alcohol. In embodiments, the at least one polar organic solvent is present in an amount of at least 10 weight % based on the total weight of the flowable brazing composition 10. More specifically, a total amount of all polar organic solvents is present in an amount of at least 10 weight %, such as from about 25 to about 30 weight %, based on the total weight of the flowable brazing composition 10. In embodiments, the flowable brazing composition 10 is free of detectable water. By "free of" as used herein, it is meant that the referenced component is not intended to be included in the composition but may be present in trace amounts, such as in amounts that are below detection limits employing conventional diagnostic methodologies. As alluded to above, the flowable brazing composition 10 also has less than or equal to about 1.5 weight % of polymeric binder components, based upon the total weight of the flowable brazing composition, and may be free of any polymeric material.

Figure 3:
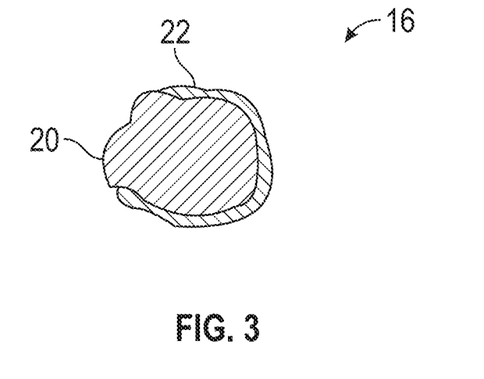
FIG. 3 is a schematic cross-sectional side view of a flux-coated particle as shown in the embodiment of the flowable brazing composition of FIG. 1.

As alluded to above and as shown in FIGS. 1 and 3, the flowable brazing composition 10 further includes flux-coated particles 16. Referring to FIG. 3, the flux-coated particles 16 include a braze material core 20 and a flux coating 22 that is disposed on the core 20. As shown in FIG. 3, the flux coating 22 at least partially covers a surface of the braze material core 20, although it is to be appreciated that the flux coating 22 may completely envelop the braze material core 20. The braze material core 20 includes the braze material, whereas the flux coating 22 does not include the braze material. The braze material core 20, as distinguished from the flux coating 22 that is disposed on the core 20, is identifiable by chemical analysis and includes different material from the flux coating 22. Further, the braze material core 20 may be identified by visual observation.

The braze material core 20 may include any conventional braze material, depending upon the particular materials of the metal articles 12 to be brazed together. In embodiments, the braze material core 20 includes a silicon-containing material, such as an alloy of silicon and metal, as the braze material. In an embodiment, the flowable brazing composition 10 is to be employed for brazing aluminum articles together, and the braze material core 20 includes an Al—Si alloy or precursor thereof as the braze material. The Al—Si alloy may optionally include additional elements for alloying and/or providing anticorrosion protection. Such additional elements include, but are not limited to, zinc, bismuth, strontium, germanium, and/or tin. One example of a suitable braze material for joining aluminum articles is an Al—Si eutectic composition, which melts at about 577° C. In embodiments, the braze material core 20 includes the silicon-containing braze material in an amount of at least 10 weight %, such as at least 50 weight %, or such as from about 90 to about 100 weight %, based on the total weight of the braze material core 20.

It is to be appreciated in other embodiments, different alloys may be employed instead of the silicon-containing material such as, but not limited to, alloys of any combination of zinc, aluminum, tin, silver, copper, or nickel, in accordance with conventional braze material chemistries.

The flux coating 22 is a solid layer at ambient temperatures and is disposed on the braze material core 20. More specifically, the flux does not flow and has no viscosity at ambient temperatures. The flux coating 22 is chemically distinguishable from the braze material core 20. The flux coating 22 is physically and/or chemically bound to a surface of the braze material core 20 and may be formed by melting the flux onto the core 20 or through other conventional methodologies such as by vapor deposition. The material of the flux coating 22 is capable of dissolving and/or otherwise remove metal oxides (e.g. aluminum oxide) at the brazing temperatures while effectively remaining inert with respect to the metal of the metal articles 12 (e.g., aluminum) at the brazing temperatures. Since fluxes are typically reactive, i.e. capable of removing oxide, only when at least partially molten, fluxes for aluminum brazing are at least partially molten at brazing temperatures, and may be completely molten at the brazing temperatures. For example, in the case of use of the aforementioned Al—Si alloy, the material of the flux coating 22 may be molten at temperatures not substantially higher, and in embodiments lower, than about 577° C. In embodiments, the flux coating 22 includes a metal halide or a salt thereof. For example, the metal halide or salt thereof may be chosen from metal fluorides, metal chlorides, or salts thereof. In a specific embodiment, the metal halide or salt thereof is an aluminum fluoride or salt thereof.

Particle size distribution and amount of the flux-coated particles 16 may contribute to storage stability of the flowable brazing composition 10. In embodiments, the flux-coated particles 16 have a D50 particle size diameter of from about 10 to about 40 μm, determined by sieve analysis. Further, at least 90 weight % of the flux-coated particles 16 may have a diameter of less than about 110 μm. Further, in embodiments, at least 95 weight % of the flux-coated particles 16 may have a diameter of less than about 1000 μm. In embodiments, the flowable brazing composition 10 includes the flux-coated particles 16 in an amount of from about 10% to about 80 weight %, such as from about 15 to about 70 weight %, such as from about 20% to about 70 weight %, or such as from about 60 to about 70 weight %, based on the total weight of the flowable brazing composition 10.

In addition to the flux-coated particles 16 and as alluded to above, the flowable brazing composition 10 may further include flux particles 18 that are separate from the flux-coated particles 16, as shown in FIG. 1. The flux particles 18 may assist with fluxing function in the flowable brazing composition 10 and may also contribute to extrudability and storage stability of the flowable brazing composition 10. The flux particles 18 may include conventional flux compounds that may be dependent upon the metal in the metal articles 12. For example, in embodiments, the flux particles 18 include a metal halide or a salt thereof. One specific example of a suitable flux material for the flux particles 18 is aluminum fluoride or a salt thereof, which is effective for fluxing aluminum articles.

It is generally known that gravitational sedimentation measures the settling rate of particles in liquid medium and relates this rate to the particle mass by use of the Stokes law. The particle mass is determined by density and particle size. Sedimentation time is longest for the finest particles, therefore, stable suspensions in the paint industry that have D95 particle size distributions below 10 μm or even sub-micrometer particles are used. Unexpectedly it was found that spherical flux particles of minimal size, produced by intensive milling, did not provide the expected storage stability of the flowable brazing composition 10. Instead they lead to particle size segregation, i.e. the different particle sizes are inhomogeneously distributed, with smaller particles found near the walls and a hard cake forming on the bottom of a vessel. Without being bound to any theory it is assumed that the fluid rheology of such a composition is that spherical flux particles of low size are mobile enough in the carrier to make room when being pressured by sedimentating flux-coated particles 16. Since fluid rheology is highly dependent upon temperature, the storage stability of the flowable brazing composition 10 is especially sensitive to temperature and an accelerated aging test at elevated temperature can reveal differences which may take weeks to develop at room temperature.

Figure 4:
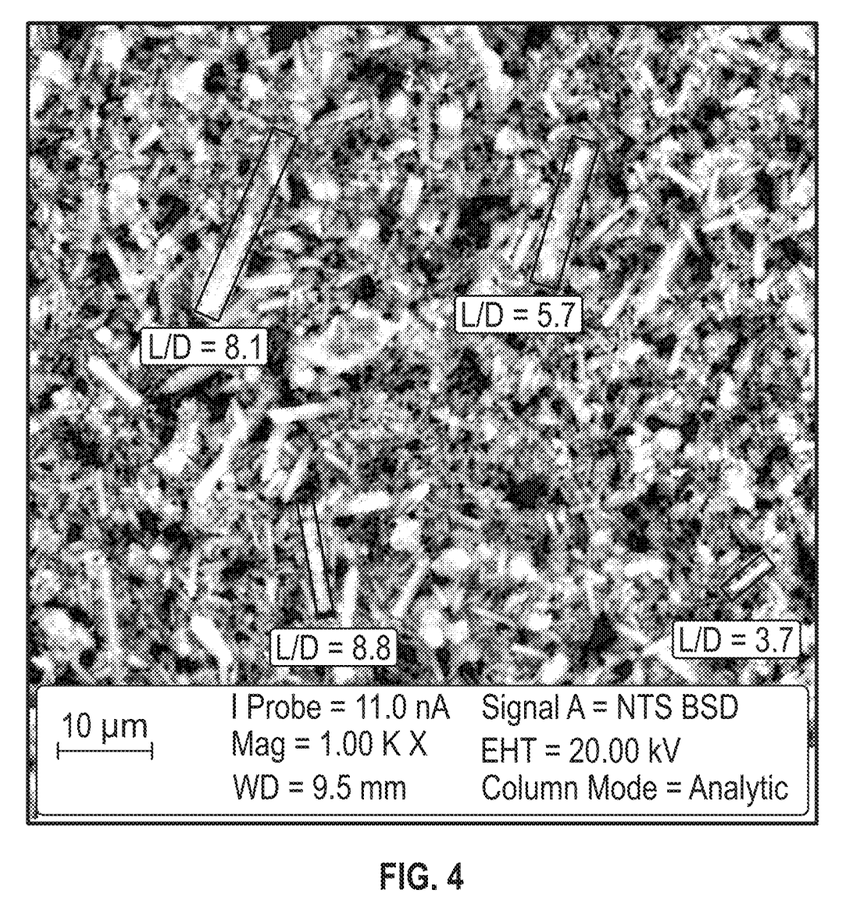
FIG. 4 is a magnified photograph of a flowable brazing composition including needle-like flux particles in accordance with an embodiment.

Non-round flux particles with a maximum length to diameter (L/D) ratio above 1 had been developed to address the storage stability difficulties. In particular, needle-like flux particles with a length to diameter (L/D) ratio from about 3 to about 10 as shown in FIG. 4 provide enhanced storage stability. Without being bound to any theory, it is assumed that the needle-like flux particles interlock with each other, limit their own movement and size segregation, and therefore considerably slowdown the settling process under gravity and minimize formation of a dense cake at the bottom of the vessel containing the composition, thereby increasing the storage stability of the flowable brazing composition 10 at room and at elevated temperatures.

In embodiments, the flux particles 18 have a D50 particle size distribution of from about 5 to about 15 μm, such as from about 7 to about 14 μm, such as from about 9 to about 12 μm, or such as from 9.5 to 11.4 μm. In embodiments, the flux particles 18 have a D95 particle size distribution of from about 10 to about 30 μm. In embodiments, the flux particles 18 are present in an amount of at least 3 weight %, such as from about 3 to about 25 weight %, such as from about 5 to about 20 weight %, or such as from about 5 to about 10 weight %, based on the total weight of the flowable brazing composition 10. In embodiments, the flux particles 18 contain needles with a Length to Diameter (L/D) ratio above 3 and up to 10 in an amount of at least 1 weight %, such as from about 1 to about 50 weight %, such as from about 2 to about 25 weight %, or such as from about 3 to about 10 weight %, based on the total weight of the flowable brazing composition 10.

In embodiments, the flowable brazing composition 10 consists essentially of the non-polymeric carrier medium, the flux-coated particles 16, the flux particles 18, and, optionally, a thickener. More particularly, the flowable brazing composition 10 includes only the aforementioned components for purposes of providing the braze material, fluxing function, and storage stability to the flowable brazing composition 10. Examples of suitable thickeners include, but are not limited to, cellulose ether of different varieties (for example, if substituted by methyl, then it is called methyl cellulose; if substituted by hydroxyethyl, then it is called hydroxyethyl cellulose; if substituted by hydroxypropyl, then it is called hydroxypropyl cellulose) or a hydrolyzed grade of polyvinyl alcohol. When present, the thickener may be included in an amount of from about 0.1 to 1 weight % based on the total weight of the flowable brazing composition 10. In embodiments, the flowable brazing composition 10 consists of the non-polymeric carrier medium, the flux-coated particles 16, the flux particles 18, and, optionally, a thickener. In embodiments, the flowable brazing composition 10 consists of the non-polymeric carrier medium, the flux-coated particles 16, and the flux particles 18. As alluded to above, the flowable brazing composition 10 is a stable suspension of the flux-coated particles 16 in the non-polymeric carrier medium. More particularly, in embodiments, the composition is free from visible solvent separation for a period of at least 25 weeks at a temperature of about 35° C. That translates to at least 50 weeks or one year storage stability at ambient temperature in accordance with conventional accelerated testing correlations. As another suitable standard for determination of solvent separation, a sample of the flowable brazing composition 10 may be placed on an inclined aluminum panel with the panel raised to a 45° angle, relative to a horizontal plane, under ambient atmosphere and an ambient temperature of about 21° C. The sample is observed for visible phase separation at time intervals. The flowable brazing compositions 10 as described herein exhibit lack of visible phase separation under the recited conditions for at least 90 seconds, such as at least 90 minutes. Viscosity may additionally be measured using a rotary viscometer.

In accordance with an embodiment and as set forth above, a method of brazing metal articles 12 together using the flowable brazing composition 10 is also provided. In accordance with the method and referring to FIGS. 1-3, the brazing composition 10 is provided as described in detail above. More specifically, the flux-coated particles 16 and the carrier medium may be mixed to form the flowable brazing composition 10, with other additional components such as the flux particles 18 also mixed. Brazing may proceed through conventional techniques. For example, the brazing composition 10 is deposited on at least one of the metal articles 12 at a location where the metal articles 12 are to be joined. In embodiments, the brazing composition 10 is first deposited on the at least one of the metal articles 12 only upon positioning the metal articles 12 to be brazed in proximity to each other. The at least one metal article 12 may be heated to substantially remove the solvent from the flowable brazing composition 10 prior to heating at brazing temperatures, or the flowable brazing composition 10 may be immediately heated at brazing temperatures in the absence of solvent removal from the flowable brazing composition 10. At least the braze material core 20 of the flux-coated particles 16 remains unmelted during any solvent removal. The metal articles 12 are then brazed together at a temperature and time sufficient to melt the core 20 of the flux-coated particles 16. In other embodiments, the brazing composition is pre-applied to a surface that is to be brazed, followed by drying to form a film on the surface to be brazed, thereby ensuring adhesion of the flux-coated particles to the surface to be brazed. Brazing may then be conducted at a later time, once metal articles 12 are assembled with the surface including the dried film in contact with another surface to be brazed.

The following Examples are intended to supplement, and not to limit, the description of the flowable brazing compositions and methods of brazing metal articles together using the same as described above.

Examples

Flowable brazing compositions were prepared in accordance with the instant disclosure and methods of brazing using the flowable brazing compositions were also conducted in accordance with the instant disclosure. Additionally, comparative brazing compositions were prepared and methods of brazing using the comparative brazing compositions were also conducted.

In a first series of Examples (Ex. 1 and Ex. 2), flux coated particles and solvent were mixed in the amounts shown in TABLE I below using a spatula, adding the flux powder during mixing with the spatula to adjust viscosity of the mixture. Mixing was continued for 1 hour, followed by adding the thickener and continuing to mix the resulting mixture for another 1 hour in the mixer to form a flowable brazing composition.

In a first Comparative Example (Comp. Ex. 1), alloy particles (i.e., non-flux coated particles) were employed instead of flux coated particles for purposes of comparison, with the flowable brazing composition of the Comparative Example prepared the same as described above.

Flux coated particles A contain 50-70% aluminium alloy with 12 wt % silicon in the alloy and 30-50% potassium tetra fluoroaluminate as the flux;
Alloy Particles A are 100% aluminium alloy with 12 wt % silicon in the alloy;
Flux Powder A is a multi-phase material consisting of potassium fluorotetraaluminate and dipotassium pentafluoroaluminate, some being present in form of their hydrate;
Thickener hydroxypropyl methyl cellulose (HPMC); and
Solvent A is propylene glycol.

Viscosity and stability of the various brazing compositions were tested under various conditions. In regards to Example 1, cooling the composition for one week down to −18° C. or heating it up for 4 weeks to +55° C. did not show any negative impact. Accelerated aging was carried out for Example 1 at 35° C. with packages taken out of storage over a period of almost one year, which corresponds to approximately 2-3 times the aging period under recommended storage temperature of 20° C. After storage, the hydrogen content was analyzed in the packages, and the results confirm the slower formation of hydrogen in Example 1 and indicate a longer shelf life. After one year the brazing quality of Example 1 was still excellent, when other braze pastes on the market are offered with 6 months shelf-life only.

The viscosity of the Example 1 compositions was 25-30 Pa·s. Brazing quality using Example 1 was excellent; gaps had been filled very well with molten filler in the braze process and defects are significantly reduced compared to a braze compositions containing a physical blend of filler and flux (e.g., Comparative Example 1).

Viscosity of the Example 2 composition (which includes 0.05 g of the thickener instead of 0.5 g as was used in Example 1) was 2.5-4 Pa s and good brazing quality and shelf life was observed.

For Example 3, too much solvent was employed and the composition was lacking in rheology properties.

For Comparative Example 1, since this composition was made from separate alloy particles and flux powder, the total surface area of the solids was higher. As a result, more of the solvent was consumed for surface wetting leading to a viscosity too high for application. Shelf-life of the Comparative Example 1 composition was not evaluated but it is known that competitive products prepared from separate filler and flux are advertised with 6 month shelf-life.

Based upon testing of Examples 1 and 2, it was found that when the flux coated particles were used suitable brazing compositions with high solid contents could be achieved with the weight of the solvents being slightly less than the half of the weight of the flux coated particles.

Additional experimentation was conducted with yet further formulas for flowable brazing compositions as well as

TABLE I

|  | Ex. 1 | | Ex. 2 | | Ex. 3 | | Comp. Ex. 1 | |
| --- | --- | --- | --- | --- | --- | --- | --- | --- |
|  | Actual Wt., g | Wt. % | Actual Wt., g | Wt. % | Actual Wt., g | Wt. % | Actual Wt., g | Wt. % |
| Flux-Coated Particles A | 30 | 65.21-68.80 | 30 | 65.86-68.88 | 30 | 52.59-54.51 | 0 | — |
| Alloy Particles A | 0 | 0 | 0 | 0 | 0 | 0 | 20 | 43.48-45.87 |
| Flux Powder A | 2-4 | 4.59-8.70 | 2-4 | 4.59-8.78 | 2-4 | 3.63-7.01 | 12-14 | 27.52-30.43 |
| Thickener | 0.1-0.5 | 0.23-1.09 | 0.05 | 0.11 | 0.04 | 0.07 | 0.1-0.5 | 0.23-1.09 |
| Solvent A | 11.5 | 25.00-26.38 | 11.5 | 25.25-26.41 | 23 | 40.32-41.79 | 11.5 | 25.00-26.38 |
| TOTAL | — | 100 | — | 100 | — | — | — | 100 | further comparative formulas. The additional experimentation is described in the following paragraphs.

Comparative Example 2

A braze composition according to the composition disclosed by U.S. Pat. No. 5,226,974 was prepared using the following components in the recited weight percentages:
39.17 weight % aluminum-silicon alloy powder;
29.17 weight % flux powder (Honeywell KA1F4 fine, article number 01740, having a purity of at least about 97 percent);
25.83 weight % propylene glycol;
5.84 weight % glycerine.

The Comparative Example 2 composition had an alloy to flux ratio of 1.34 and an initial viscosity of above 5000 cps. A portion of this braze composition was stored at room temperature for 10 days and the solids did not sediment completely to the bottom of the braze composition.

Hydrogen evolution was evaluated by storing 1 kg of the Comparative Example 2 braze composition in a closed container. For the measurement, the container is placed inside a large plastic bag. A hydrogen sniffer tube is inserted through the mouth of the bag and the opening sealed with a rubber band. The container was then opened inside the bag and the level of hydrogen released was measured. After 10 days stored at 20° C., the Competitive Example 2 composition did not show any hydrogen in this test. To accelerate the hydrogen evolution and shorten the time for the test, hydrogen evolution was tested with other containers holding the Comparative Example 2 composition that had been stored at elevated temperature of 35° C., with one container measured every month. After 6 months, the hydrogen reached a level of $3 \times 10^{-3}$ ppm. Close to the surface of the braze composition, the initial hydrogen level was about $2.5 \times 10^{-2}$ ppm.

For testing melt generation and flux activity, a small volume of the Comparative Example 2 brazing composition was applied to an aluminium coupon. Test samples were placed on a production rack and run through a brazing furnace with a full load of assembled heat exchanger cores. After brazing, spreading of the melt and flux on the test coupon was measured. For production evaluation, the Comparative Example 2 brazing composition was applied to baffles and fittings of assembled heat exchangers. Joint formation and braze-related reject rate of leaking heat exchangers was examined after brazing. For testing braze repair performance, the Comparative Example 2 brazing composition was applied to defective brazed joints for re-brazing. The quality of the repaired joint was examined. The Comparative Example 2 braze composition exhibited adequate performance for melt generation, flux activity, joint formation, reject rate, and braze repair. However, post-braze flux residue was high as observed through qualitative observation.

Comparative Example 3

Another comparative example of a braze composition was prepared, with the composition of this formula having an alloy to flux ratio of 2 for purposes of reducing the post-braze flux residue. Comparative Example 3 was prepared using the following components in the recited weight percentages:
44.83 weight % aluminium-silicon alloy powder;
22.41 weight % flux powder (Honeywell KA1F4 fine, article number 01740, having a purity of at least about 97 percent);
26.72 weight % propylene glycol;
6.03 weight % glycerine.

The Comparative Example 3 composition had an initial viscosity of above 5000 cps. A portion of this braze composition was stored at room temperature for 10 days and the solids did not sediment completely to the bottom of the braze composition.

For testing melt generation and flux activity, conducted in the same manner as described above for Comparative Example 2, the spreading of the Comparative Example 3 brazing composition was found lacking. This deficit is believed to be due to the reduced flux amount, and it is believed that the flux amount was not sufficient to activate the higher amount of aluminium-silicon alloy powder and still activate the same area of the aluminium coupon as compared to Comparative Example 2. The area covered was approximately 14% smaller compared to Comparative Example 2.

For production evaluation, the Comparative Example 3 brazing composition was applied to baffles and fittings of assembled heat exchangers and assessed in the same manner as described above for Comparative Example 2 for joint formation and braze-related reject rate. Using the Comparative Example 3 brazing composition, the reject rate increased from 1.9 to 2.4% and the quality of the repaired joint was not good either. As such, Comparative Example 3 did not pass production evaluation.

Example 4

A flowable braze composition with an alloy to flux ratio of 3 was prepared using flux coated aluminium-silicon alloy powder and the following components, wherein the percentages are by weight:
67.44 weight % flux melt coated aluminium-silicon alloy powder, prepared from 75% aluminium-silicon and 25% Honeywell KA1F4 fine and having a fine particles size sufficiently low to at least pass through a 1000 μm standard sieve with less than 5% residue on the sieve;
15 weight % propylene glycol;
15 weight % 2-methyl-2,4-pentanediol (hexylene glycol).

The Example 4 braze composition so produced had an initial viscosity of above 5000 cps. A portion of this braze composition was stored at room temperature for 10 days and the solids did not sediment completely to the bottom of the paste.

In the melt generation and flux activity test, conducted as set forth above for Comparative Example 2, the spreading of the brazing paste was found to be acceptable. In the production evaluation test, also conducted in the same manner as described above for Comparative Example 2, the braze composition increased the reject rate from 1.9 to 2.1%, which is still considered acceptable. Therefore, Example 4 was deemed to pass production evaluation testing.

Example 5

A flowable braze composition with an alloy to flux ratio of 2.55 was prepared using flux coated aluminium-silicon alloy powder and the following components, wherein the percentages are by weight:
68.18 weight % flux melt coated aluminium-silicon alloy powder, prepared from 75% aluminium-silicon and 25% Honeywell KA1F4 fine and having a fine particles size sufficiently low to at least pass through a 1000 μm standard sieve with less than 5% residue on the sieve;

3.03 weight % flux powder (Honeywell KAlF4 fine, article number 01740, having a purity of at least about 97 percent);

25.91 weight % propylene glycol;

2.88 weight % 2-methyl-2,4-pentanediol (hexylene glycol).

The Example 5 braze composition so produced had an initial viscosity of above 5000 cps. A portion of this braze composition was stored at room temperature for 10 days and the solids did not sediment completely to the bottom of the paste.

In the melt generation and flux activity test, conducted as set forth above for Comparative Example 2, the spreading of the brazing paste was found to be excellent. In the production evaluation test, also conducted in the same manner as described above for Comparative Example 2, the braze composition decreased the reject rate from 1.9 to 1.7%, which is considered good performance. Therefore, Example 5 was deemed to pass production evaluation testing.

Example 6

A flowable braze composition with an alloy to flux ratio of 2.33 was prepared using flux coated aluminium-silicon alloy powder and the following components, wherein the percentages are by weight:

59.72 weight % flux melt coated aluminium-silicon alloy powder, prepared from 75% aluminium-silicon and 25% Honeywell KAlF4 fine and having a fine particles size sufficiently low to at least pass through a 1000 μm standard sieve with less than 5% residue on the sieve;

4.27 weight % flux powder (Honeywell KAlF4 fine, article number 01740, having a purity of at least about 97 percent);

28.82 weight % propylene glycol;

7.2 weight % 2-methyl-2,4-pentanediol (hexylene glycol).

The Example 6 braze composition so produced had an initial viscosity of above 5000 cps. A portion of this braze composition was stored at room temperature for 10 days and more solids sediment than Example 5 were observed.

For the Example 6 braze composition, additional evaluation was conducted for hydrogen evolution by employing accelerated storage conditions for 1 kg of braze composition in a closed container at elevated temperature of 35° C. Hydrogen evolution was measured at various time intervals and is provided in TABLE II.

TABLE II

| Age [days] | H2 level [ppm] |
| --- | --- |
| 60 | 1.70E−04 |
| 60 | 1.50E−04 |
| 80 | 3.90E−05 |
| 126 | 5.50E−05 |
| 147 | 2.60E−05 |
| 218 | 3.50E−05 |
| 288 | 6.40E−05 |

Compared to the Comparative Example 2 braze composition, the hydrogen levels are reduced and the accelerated storage samples show only a small increase in H2 evolution. This compatibility is believed to be due to the relative inertness of the flux melt coated aluminium-silicon alloy powder towards reactions that generate hydrogen.

Example 7

A flowable braze composition with an alloy to flux ratio of 2.06 was prepared using flux coated aluminium-silicon alloy powder and a thickener known to be compatible with the brazing process, along with the following components wherein the percentages are by weight:

61.16 weight % flux melt coated aluminium-silicon alloy powder, prepared from 75% aluminium-silicon and 25% Honeywell KAlF4 fine and having a fine particles size sufficiently low to at least pass through a 1000 μm standard sieve with less than 5% residue on the sieve;

7.02 weight % flux powder (Honeywell KAlF4 fine, article number 01740, having a purity of at least about 97 percent);

25.12 weight % propylene glycol;

6.28 weight % 2-methyl-2,4-pentanediol (hexylene glycol); and 0.41 percent hydroxypropyl cellulose (thickener).

The Example 7 braze composition so produced had an initial viscosity of above 10000 cps. A portion of this braze composition was stored at room temperature for 10 days and less solids sediment than Example 5 were observed.

In the melt generation and flux activity test, conducted as set forth above for Comparative Example 2, the spreading of the brazing paste was found to be excellent. In the production evaluation test, also conducted in the same manner as described above for Comparative Example 2, the braze composition decreased the reject rate from 1.9 to 1.7%, which is considered good performance. Therefore, Example 7 was deemed to pass production evaluation testing.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration in any way. Rather, the foregoing detailed description will provide those skilled in the art with a convenient road map for implementing an exemplary embodiment. It being understood that various changes may be made in the function and arrangement of elements described in an exemplary embodiment without departing from the scope as set forth in the appended claims.

What is claimed is:

1. A flowable brazing composition comprising:
   a non-polymeric carrier medium, wherein the carrier medium comprises at least one polar organic solvent and is liquid at ambient temperature;
   flux-coated particles including a braze material core and a flux coating disposed on the core, wherein the braze material core includes different material from the flux coating;
   wherein the flowable brazing composition has less than or equal to about 1.5 weight % of polymeric binder components, based upon a total weight of the flowable brazing composition.

2. The flowable brazing composition of claim 1, wherein the composition is a stable suspension of the flux-coated particles in the carrier medium, and wherein the composition is free from visible solvent separation for a period of at least 25 weeks at a temperature of about 35° C.

3. The flowable brazing composition of claim 1, wherein the at least one polar organic solvent includes a C2-C10 aliphatic glycol.

4. The flowable brazing composition of claim 3, wherein the at least one polar organic solvent includes hexylene glycol.

5. The flowable brazing composition of claim 4, wherein the at least one polar organic solvent further includes a C2-C4 glycol.

6. The flowable brazing composition of claim 1, wherein the at least one polar organic solvent is present in an amount of at least 10 weight % based on the total weight of the flowable brazing composition.

7. The flowable brazing composition of claim 1, further comprising flux particles separate from the flux-coated particles.

8. The flowable brazing composition of claim 7, wherein the flux particles are present in an amount of at least 3 weight % based on the total weight of the flowable brazing composition.

9. The flowable brazing composition of claim 7, wherein the flux particles comprise a metal halide or a salt thereof.

10. The flowable brazing composition of claim 7, wherein the flux particles have a D50 particle size distribution of from about 5 to about 15 μm.

11. The flowable brazing composition of claim 7, wherein at least some of the flux particles have a length to diameter (L/D) ratio from about 3 to about 10.

12. The flowable brazing composition of claim 1, wherein the braze material core comprises a silicon-containing material.

13. The flowable brazing composition of claim 12, wherein the braze material core comprises an alloy of silicon and a metal.

14. The flowable brazing composition of claim 13, wherein the braze material core comprises an Al—Si alloy or precursor thereof.

15. The flowable brazing composition of claim 1, wherein the flux coating comprises a metal halide or a salt thereof.

16. The flowable brazing composition of claim 1, wherein the flux-coated particles have a D50 particle size diameter of from about 30 to about 60 μm.

17. The flowable brazing composition of claim 1, further comprising a thickener.

18. The flowable brazing composition of claim 1, free of detectable water.

19. A method of brazing metal articles together using a flowable brazing composition, wherein the method comprises:
providing a brazing composition comprising:
a non-polymeric carrier medium, wherein the carrier medium comprises at least one polar organic solvent and is liquid at ambient temperature;
flux-coated particles including a braze material core and a flux coating disposed on the core, wherein the flux coating comprises a metal halide and wherein the braze material core includes different material from the flux coating;
wherein the flowable brazing composition has less than or equal to about 1.5 weight % of polymeric binder components, based upon a total weight of the flowable brazing composition;
depositing the brazing composition on at least one of the metal articles at a location where the metal articles are to be joined;
heating the at least one metal article to substantially remove the solvent from the flowable brazing composition; and
brazing the metal articles together at a temperature and time sufficient to melt the core of the flux-coated particles.

20. A flowable brazing composition consisting of:
a non-polymeric carrier medium, wherein the carrier medium consists of one or more polar organic solvents and is liquid at ambient temperature;
flux-coated particles including a braze material core and a flux coating disposed on the core, wherein the flux coating comprises a metal halide and wherein the braze material core includes different material from the flux coating;
flux particles separate from the flux-coated particles; and
optionally, a non-polymeric thickener.

* * * * *